US011054662B2

(12) United States Patent
Mendis et al.

(10) Patent No.: US 11,054,662 B2
(45) Date of Patent: Jul. 6, 2021

(54) POLARIZING BEAM SPLITTER FOR THZ RADIATION

(71) Applicants: BROWN UNIVERSITY, Providence, RI (US); OSAKA UNIVERSITY, Osaka (JP)

(72) Inventors: Rajind Mendis, Providence, RI (US); Masaya Nagai, Osaka (JP); Daniel M. Mittleman, Providence, RI (US)

(73) Assignees: Brown University, Providence, RI (US); Osaka University, Osaka (JP)

(*) Notice: Subject to any disclaimer, the term of this patent is extended or adjusted under 35 U.S.C. 154(b) by 0 days.

(21) Appl. No.: 16/467,780

(22) PCT Filed: Dec. 11, 2017

(86) PCT No.: PCT/US2017/065524
§ 371 (c)(1),
(2) Date: Jun. 7, 2019

(87) PCT Pub. No.: WO2018/107142
PCT Pub. Date: Jun. 14, 2018

(65) Prior Publication Data
US 2020/0064645 A1 Feb. 27, 2020

Related U.S. Application Data

(60) Provisional application No. 62/432,157, filed on Dec. 9, 2016.

(51) Int. Cl.
G02B 5/30 (2006.01)
G02B 27/28 (2006.01)

(52) U.S. Cl.
CPC ......... *G02B 27/283* (2013.01); *G02B 5/3058* (2013.01)

(58) Field of Classification Search
CPC ........ G02B 27/28; G02B 27/283; G02B 5/30; G02B 5/3041; G02B 5/3058;
(Continued)

(56) References Cited

U.S. PATENT DOCUMENTS

| 2006/0072114 A1* | 4/2006 | Sigalas | G02B 6/1225 356/445 |
| 2015/0153234 A1* | 6/2015 | Kozlov | G02F 1/3532 250/341.1 |

(Continued)

FOREIGN PATENT DOCUMENTS

| CN | 105372758 A | 3/2016 |
| CN | 106058394 A | 10/2016 |
| CN | 106248616 A | 12/2016 |

OTHER PUBLICATIONS

PCT/US2017/065524 International Search Report and Written Opinion; dated Mar. 29, 2018.

*Primary Examiner* — Mustak Choudhury
(74) *Attorney, Agent, or Firm* — Adler Pollock & Sheehan P.C.

(57) ABSTRACT

A polarizing beam splitter includes thin electrically conductive metal sheets each having an edge and a thickness substantially less than the wavelength λ of a terahertz signal. The sheets are arranged in a stack or array to define wave propagation passages for energy of a terahertz beam directed at a face formed by edges of the sheets, and constitutes an artificial dielectric which operates below cutoff to allow selective transmission through the passages and/or reflection from said face, separating polarization states of the beam with defined power splitting. The artificial dielectric beam splitter can be configured to operate over a broad terahertz band. The sheets are flat, without micropatterned surface features, are robust and simple to manufacture, and form a broad band polarizing beam slitter for terahertz radiation.

(Continued)

Complete separation of the transmitted and reflected beam is achieved below cutoff by rotating the polarization of the input beam.

8 Claims, 6 Drawing Sheets

(58) Field of Classification Search
CPC ...... G02B 5/3083; G02B 6/274; G02B 13/14; G01N 21/21; G01N 21/3581; G01N 21/3586; G01N 21/55; H01Q 15/24; H01S 3/0057; H01S 3/098; H01S 3/06712; H01S 3/06791
USPC ................ 359/337, 350–352, 483.01; 372/6; 250/338.1
See application file for complete search history.

(56) References Cited

U.S. PATENT DOCUMENTS

2015/0205079 A1* 7/2015 Takayanagi ........ G01N 21/3581
  250/338.1
2016/0209567 A1* 7/2016 Suzuki ................ G02B 5/3058

* cited by examiner

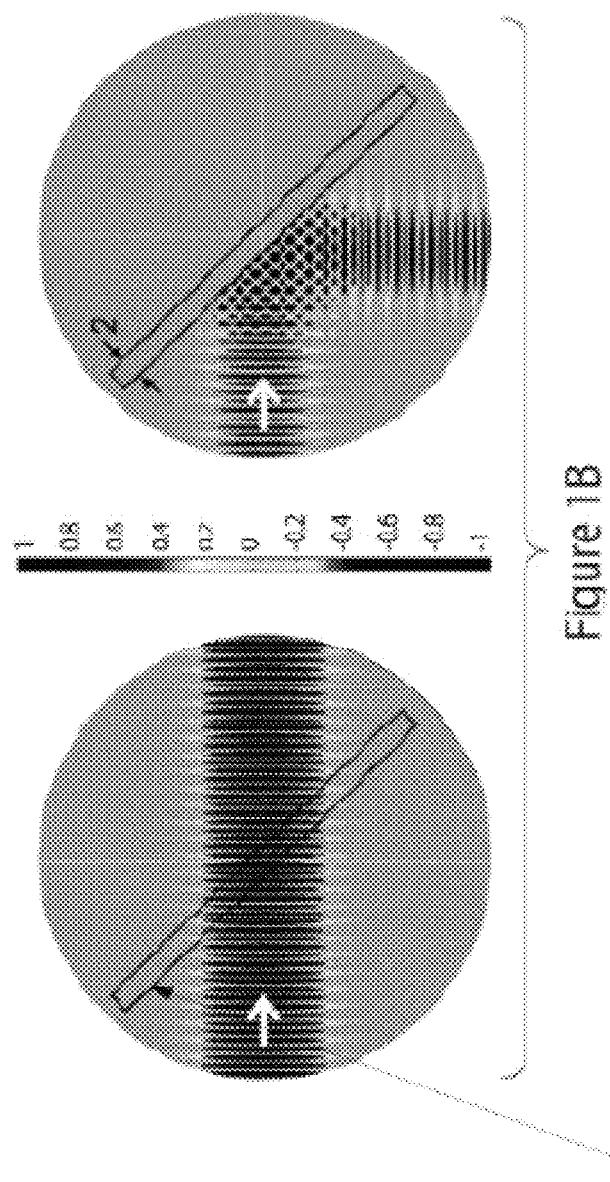

POLARIZING BEAM SPLITTER FOR THZ RADIATION

CROSS REFERENCE TO RELATED APPLICATIONS

This application is a national phase filing under 35 U.S.C. § 371 of International Application No. PCT/US2017/065524, filed Dec. 11, 2017, which claims priority from U.S. Provisional Application No. 62/432,157, filed Dec. 9, 2016, the entire contents of which are incorporated herein by reference.

GOVERNMENT SUPPORT

This invention was made with government support under grant ECCS1609521 awarded by the National Science Foundation. The government has certain rights in the invention.

BACKGROUND

Terahertz radiation, also known as submillimeter radiation, consists of electromagnetic waves within the band of frequencies from 0.1 to 10 terahertz (THz, where one THz is $10^{12}$ Hz). Wavelengths of radiation in the terahertz band correspondingly range from 3 mm to 0.03 mm (or 30 µm).

Terahertz radiation occupies a middle ground between microwaves and infrared light waves, and the technology or instrumentation for generation and manipulation of terahertz radiation is in its infancy. In the terahertz band or region of the electromagnetic spectrum, the frequency of electromagnetic radiation becomes too high to be measured digitally via electronic counters, so must be measured by proxy using the properties of wavelength and energy. Similarly, the generation and modulation of coherent electromagnetic signals in this frequency range ceases to be possible with the conventional electronic devices used to generate radio waves and microwaves, and thus will require development of new devices and techniques. However, generation, modulation and analysis of terahertz signals and their interactions also offer the prospect of new analytic measurements and detection utilizing characteristics and interactions that do not generally occur in nature. For example the refractive index of an artificial dielectric beam-shaping construction formed of stacked parallel plate waveguides, can have a value less than unity. Also, by way of example, photon energy in THz regime is less than band-gap of nonmetallic materials and thus THz beams can traverse through such materials. A transmitted THz beam can therefore be used for material characterization, layer inspection and developing transmission images. Although instrumentation for generating and for analyzing THz signals remains largely undeveloped, it is reasonable to expect that like lower frequency signals, THz radiation will, with appropriate instrumentation, be useful for communications and carry information signals, be analyzed to detect properties of material with which it has interacted, and serve as a probe for imaging and other measurement or detection purposes.

A polarizing beam splitter, if one could be devised for terahertz signals, would be highly useful for manipulating, separating, filtering, selectively blocking or conditioning terahertz radiation, and the development of such a beam splitter with robust and well-characterized performance characteristics would constitute an enabling event for further development of practical terahertz technologies and instruments.

There have been a few research studies on polarizing beam splitters for terahertz radiation, some based upon or analogous to the technology used for optical or microwave beam splitting—for example based upon dielectric bi-layers, or upon diffraction gratings, or metamaterial constructions. All of these attempts, however, called for advanced fabrication techniques requiring costly photolithography methods and equipment, and have limited prospects for mass production or general application to robust broadband applications.

There thus remains a need for a robust, well-characterized stable and easily manufactured polarizing beam splitter for terahertz signals that does not rely on micropatterned surface features.

SUMMARY OF THE INVENTION

This is achieved in accordance with the present invention by providing an artificial dielectric medium formed as a uniformly-spaced stack or array of rectangular conductive metal plates each having an edge and being aligned with and spaced apart by a distance d from an adjacent plate, such that a portion of the beam directed at a virtual face defined by the plate edges is transmitted through the splitter by entering and travelling in the passage between plates to the opposite edge, and/or is partially reflected at the face. The reflected, or transmitted energy has defined magnitude and polarization state. For example, a linearly polarized terahertz radiation beam is split into two orthogonal polarization components in a pre-determined power ratio. The polarizing beam splitter so constructed can be used to separate illumination and return signals of an inspection instrument, or to accurately separate one polarization or a portion of a terahertz beam for separate processing or measurement. Importantly, by controlling the polarization of a terahertz signal directed at the beam splitter, the unit will operate below cutoff with low insertion loss and a defined splitting ratio.

In one representative prototype construction, the plates are smooth sheets of stainless steel 30 µm thick and are spaced 300 µm apart. The sheets are formed with a pair of through-holes positioned to fit over a pair of posts or rods which hold all sheets of the array in alignment, and each sheet is rectangular so that the stack forms a block with the set of sheet edges defining a virtual face of the block. The block may be mounted in a jig or fixture so that it may be positioned at an angle θ to the path of an incident beam, and oriented to directly transmit and reflect different polarizations along different paths, with a predetermined power ratio. A metal other than stainless steel may be used to form the beamsplitter, so long as the metal is stiff enough to maintain the desired parallel-plate spacing and can be manufactured as a thin smooth sheet. The sheet thickness is small compared to the nominal wavelength λ of the terahertz signal, for example than λ/10, and the sheet spacing d is smaller than λ/2 cos θ to define narrow wave propagation passages between successive metal sheets to operate below cutoff. This stacked parallel plate waveguide (PPWG) assembly configured as a polarization beam splitter can be fabricated without specialized surface patterning, and operates over a broad band with well defined splitting ratio and low insertion loss.

By way of background, an artificial dielectric lens construction using parallel plate waveguides has been previously described in *Scient. Rep.* 6, 23023 (2016) using a stack of plates with a plano-concave shape that results in convergent beam focusing to a 4 mm spot at a design frequency of 0.17 THz. During that investigation, it was noted that the overall power transmission of the artificial dielectric lens can be better than that of conventional dielectric lenses commonly used in the THz regime; and further that under certain conditions the lens boundary demarcated by the plate edges actually resembles a smooth continuous surface, but with a cutoff frequency dependent on the plate spacing. That investigation employed a 1 mm plate separation, corresponding to a refractive index of 0 at a cutoff frequency of 0.15 THz for propagation of the lowest-order transverse electric ($TE_1$) mode whose electric field vector is oriented parallel to the plates. Below cutoff, the $TE_1$ mode is totally reflected at the input face. Thus the beamsplitter allows the precise separation and transmission through the beamsplitter of the TEM mode. Moreover, by rotating the polarization of the input beam one can control or achieve a well-defined power division. Moreover, the transmitted TEM mode propagates between the plates without dispersion resulting in a well-defined time domain signal.

BRIEF DESCRIPTION OF THE DRAWINGS

These and other features of the invention will be understood from the Disclosure and the Claims appended hereto, taken together with the Figures wherein

FIG. 1B shows FEM simulations at 0.2 THz of total transmission (left hand side) when the input is polarized perpendicular to the plates, and total reflection (right hand side) when the input is polarized parallel to the plates;

DETAILED DESCRIPTION

Figure 1A:
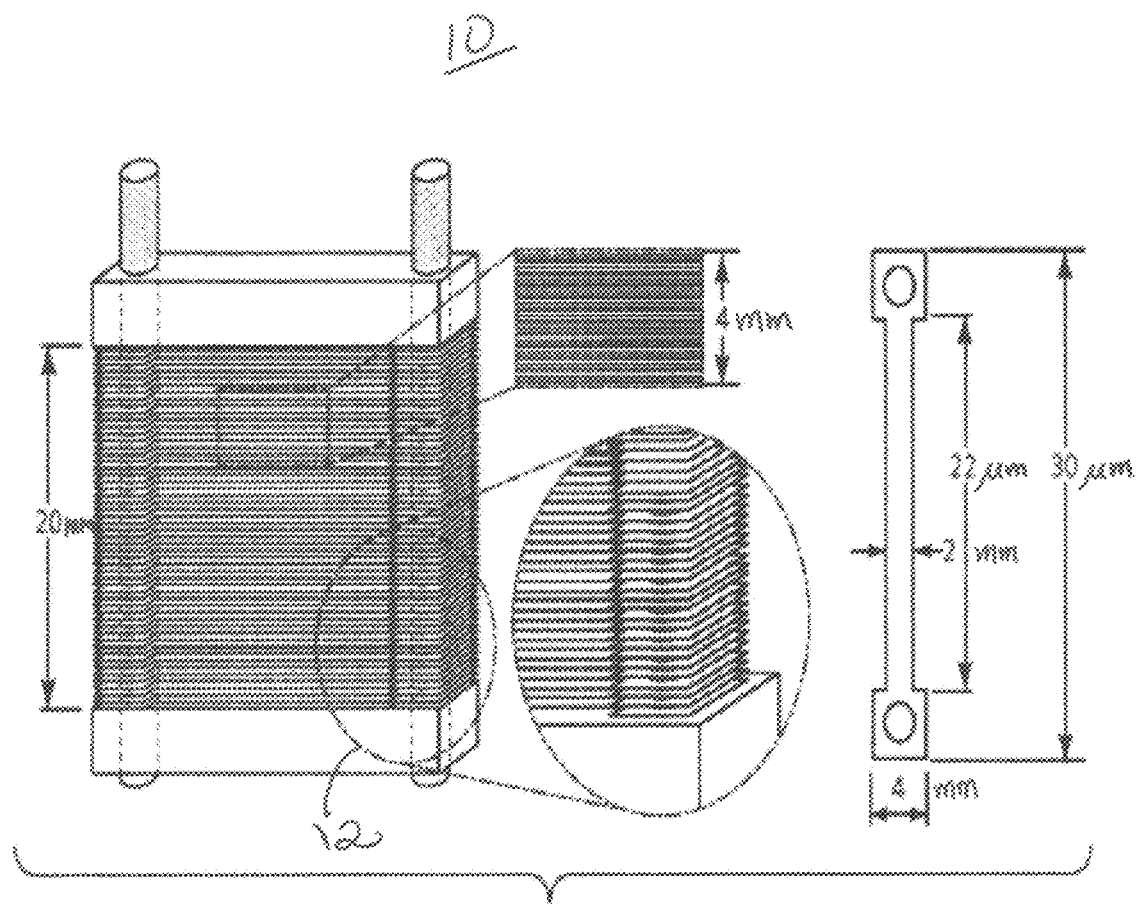
FIG. 1A shows (a) a perspective view of an artificial dielectric beamsplitter formed by a stack of conductive sheets (b) mounted on posts for insertion in a beam path.
Figure 1C:
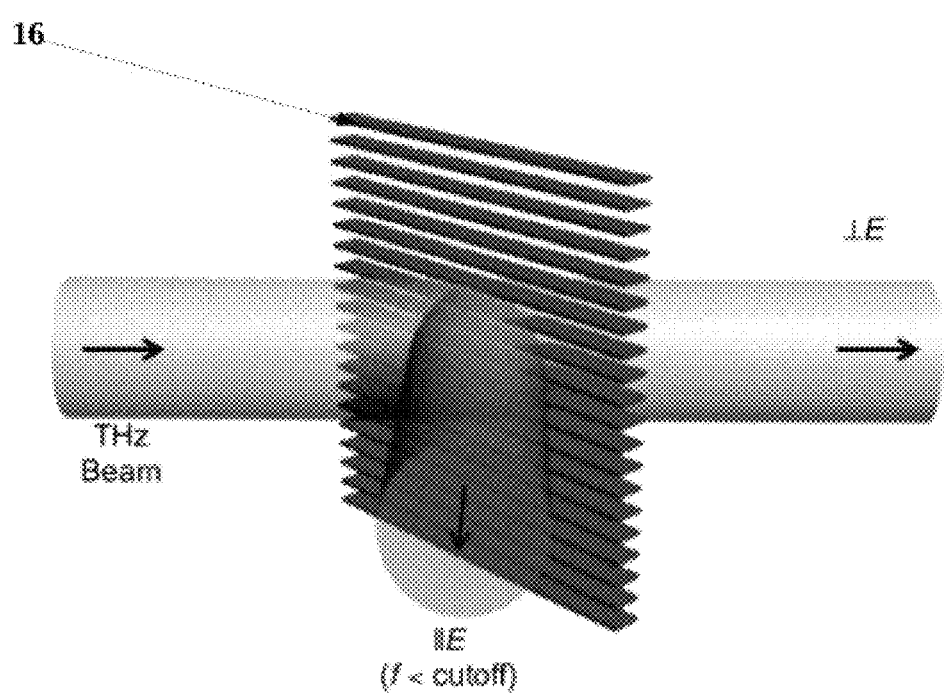
FIG. 1C schematically illustrates beam reflection and beam transmission through the parallel plates below cutoff for electric field polarized parallel and perpendicular to the plates

FIGS. 1A, 1B and 1C show perspective views of an artificial dielectric beamsplitter 10 formed by a stack of conductive sheets each having an edge 12 and being aligned with and spaced apart by a distance d from an adjacent plate, such that a portion of the beam directed at a virtual face 14 (FIG. 1B) defined by the plate edges 16 (FIG. 1C) is transmitted through the splitter by entering and traveling in the passage between plates to the opposite edge, and/or is partially reflected at the virtual face.

At the design frequency of 0.2 THz, our polarizing beam splitter (PBS) exhibits an extinction ratio of 42 dB in transmission and 28 dB in reflection with an overall insertion loss of 0.18 dB. These values rival the specifications of polarizing cube beamsplitters that are commercially available for visible and near-infrared wavelengths.

As described supra, the artificial dielectric medium consists of a uniformly spaced stack of identical, rectangular metal plates. This stack-of-plates is electromagnetically equivalent to a stacked array of parallel-plate waveguides (PPWGs). The plates are made of 30 μm thick stainless steel and are spaced 300 μm apart, as seen in the prototype device shown in FIG. 1(a). This aspect ratio of 1:10 between the plate thickness and the plate spacing was chosen to maximize device efficiency while at the same time, achieving mechanical robustness. Unnecessarily thick plates would result in undesirable reflection losses, while overly thin plates may not provide adequate robustness to realize the required uniform plate spacing. The plates and the spacers are fabricated by chemical etching to avoid introducing strain or creating burrs, and this helps to maintain plate flatness. The device is assembled by stacking the plates and spacers alternating along two locating posts, such that the plates are free-standing, supported only by their ends. At each end, there is an integrated square pad with a mounting hole. Once assembled, this stacked-plate arrangement results in a clear aperture of 20 mm. The magnified, close-up view of the 4 mm square section of the clear aperture illustrates the flatness of the plates and the uniformity of their spacing. Taking a slice across this image and using a graphical reconstruction method, we measured an average center-to-center plate spacing of 330 μm, with a standard deviation of 5 μm.

In the designed PBS device geometry, the THz beam is directed at the stack-of-plates at an angle of 45° to the virtual surface emulated by the plate edges, with the plane of incidence parallel to the plate surfaces. The operation of the PBS relies on both the TEM and $TE_1$ fundamental modes of the PPWG. When the input electric-field is linearly polarized perpendicular to the plates (s-polarized), only TEM modes are excited in the PPWG array, and the beam propagates through the device without altering its path. This behavior may be illustrated in a COMSOL FEM simulation result which plots the instantaneous electric field of the propagating beam along the axial cross-section parallel to the plate surfaces, at a frequency of 0.2 THz. As long as the input beam diameter is sufficiently larger than the plate spacing (for proper mode-matching) and the interaction path-length is short, this TEM-mode propagation will be a very efficient (i.e., low loss) process. On the other hand, when the input electric field is linearly polarized parallel to the plates (p-polarized), only $TE_1$ modes can be excited in the PPWG array, and the propagation is governed by the mode's cutoff frequency. Input frequencies that are above the cutoff will propagate through the device, while those that are below the cutoff will be reflected. In fact, these below-cutoff frequencies will be totally and specularly reflected in a well-defined beam, which may be illustrated in an FEM simulation result which plots the instantaneous magnetic field of the propagating beam at a frequency of 0.2 THz.

Under oblique incidence, the $TE_1$-mode cutoff frequency is given by $c/(2b \cos \alpha)$, where c is the free-space velocity, b is the plate spacing, and α is the incidence angle. For the demonstrated device, the cutoff is at 0.7 THz when the device is illuminated at 45°. Now, if the input electric-field is linearly polarized at an arbitrary angle (between 0° and 90°) to the plates, both the TEM and $TE_1$ modes are excited simultaneously. Then, the portion of the input beam (the perpendicular component) propagating via the TEM mode exits the device on axis, polarized perpendicular to the plates. This TEM-mode contribution is independent of the frequency. In contrast, the portion that could excite the $TE_1$ mode (the parallel component), if below cutoff, is totally reflected at 90° to the input axis, polarized parallel to the plates. By varying the angle of the input polarization, one can therefore control the power division into the two output arms, thereby realizing a versatile PBS. Incidentally, if there is any parallel component at a frequency above the cutoff, this portion would propagate through the device via the $TE_1$ mode and exit the device with a slight lateral shift, polarized parallel to the plates. The lateral shift is caused by the refraction of the beam inside the device due to the lower refractive index compared to free-space. Since the PBS operation would be somewhat degraded by any excitation of the $TE_1$ mode, the upper limit of the operational bandwidth of the PBS is set by the mode's cutoff frequency. It follows that the operational bandwidth can be increased by decreasing the plate spacing and/or increasing the incidence angle.

Experimental Characterization

The prototype PBS device was experimentally investigated in both transmission and reflection configurations using a THz time-domain spectroscopy system. In this spectroscopy system, both the transmitter and receiver modules are fiber coupled to the main controller unit, so as to accommodate the multiple polarization axes and spatial configurations.

Throughout the experiment, the device was located between two wire-grid polarizers to purify the input and detected linear polarizations. Via external optics, the input beam was formed to a frequency-independent 1/e Gaussian diameter of approximately 10 mm and entered the device fairly well collimated. The same optical arrangement was employed for the output beam to maintain input-output symmetry. While the input optics were fixed in space, the detector sub-system could be moved (intact) from the on-axis position to the 90°-off-axis position to change from a transmission configuration to a reflection configuration. A 16 mm diameter aperture was situated in close proximity to the input transverse-plane of the device. This eliminated any energy "spill-over", providing a true reference signal when the device was not in the beam path, and also served as a marker for the beam axis. In addition to three-axis linear translation, the device mount also included a precision rotation stage to adjust the incidence angle in the horizontal plane, along with precision control of the tilt in two perpendicular vertical planes, allowing complete three-axis rotational positioning.

Figure 2:
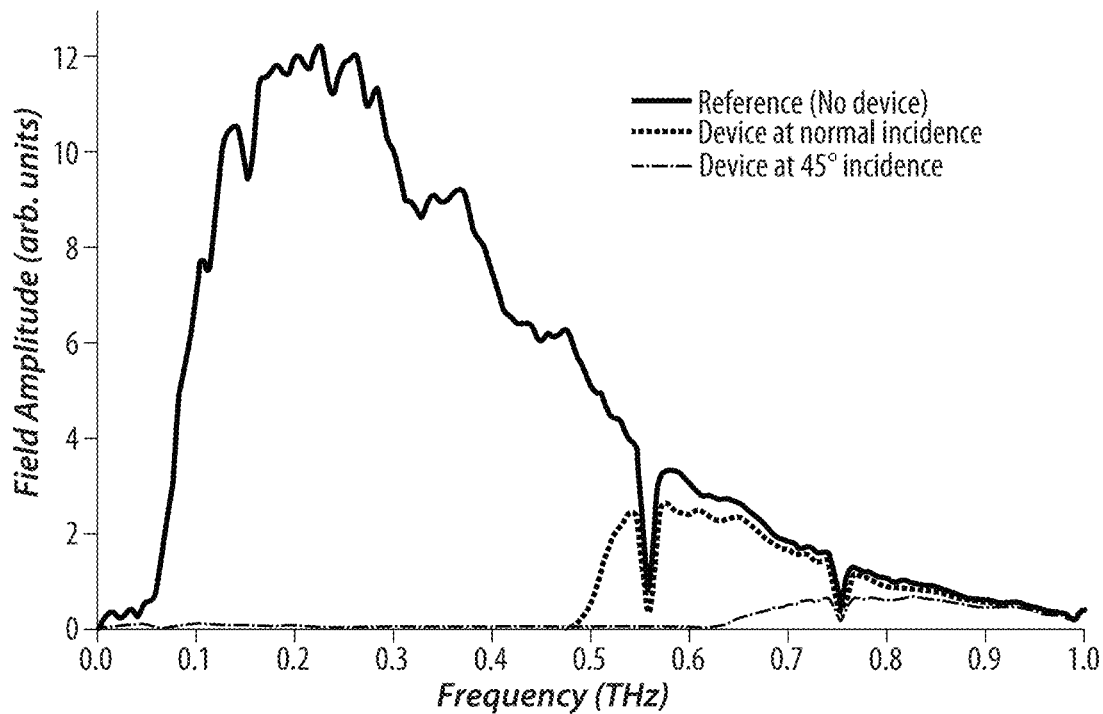
FIG. 2 shows the transmission spectra in the $TE_1$ mode, illustrating the cutoff when the input beam is at normal incidence to the device, and at 45° incidence (the standard operational configuration).

Various measured amplitude spectra that were obtained by Fourier transforming the detected time-domain signals are shown in FIG. 2. These spectra correspond to the purely $TE_1$-mode behavior of the device in transmission. During this measurement, both the transmitter and receiver polarization axes (along with the input and output polarizer axes) were kept horizontal. One curve corresponds to the reference signal when there is no device in the path of the beam. The sharp dips seen at 0.56 THz and 0.75 THz are due to water vapor absorption. Another curve corresponds to the signal when the device is in the path of the beam at normal incidence. This spectrum indicates a cutoff near 0.5 THz, as expected for a 300 µm plate spacing. A further curve corresponds to the signal when the device is at 45° incidence (the designed operating configuration), and as predicted by theory, the cutoff shifts to a value near 0.7 THz. This $TE_1$-mode diagnostic measurement is indicative of the quality of the device and serves to estimate the operational bandwidth of the PBS.

Figure 3:
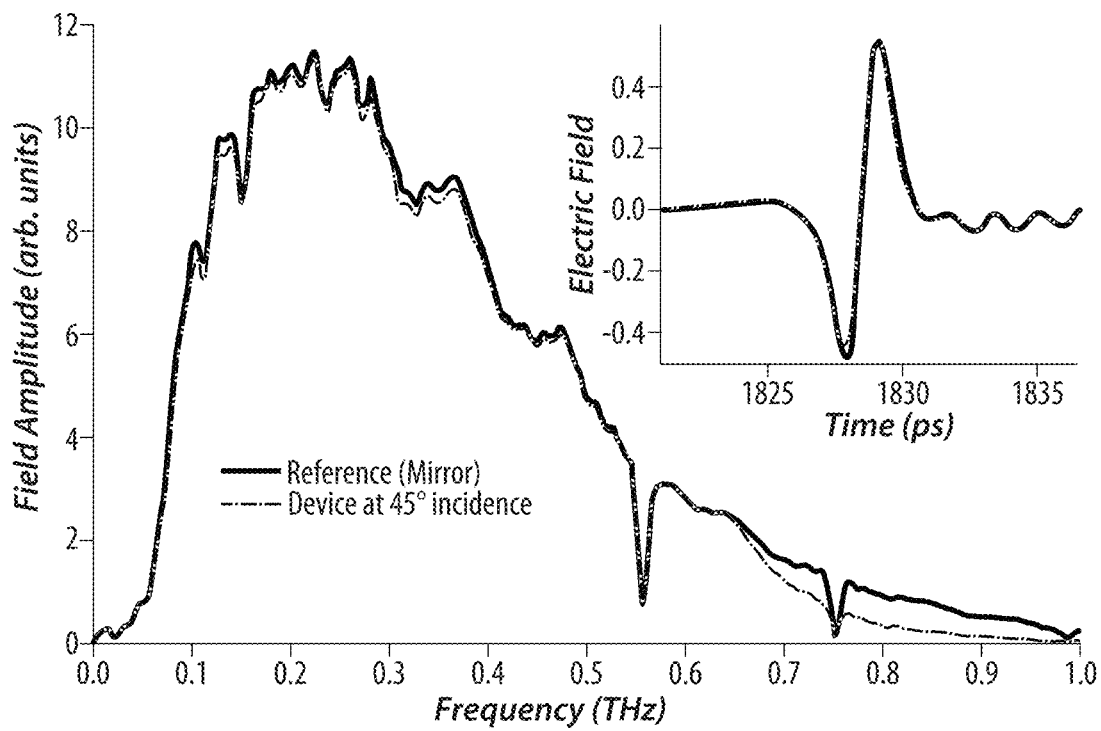
FIG. 3 shows the reflection spectra in the $TE_1$ mode compared to a mirror (dark line). A figure inset shows the corresponding time-domain signals.

For the spectra in FIG. 3, the polarization axes of the transmitter, receiver, and the polarizers were maintained horizontal as before, but the detector sub-system was moved to measure the reflected signal. One curve corresponds to the reflected signal when the device is at 45° incidence. Another curve corresponds to the reference signal when the device is replaced by a polished aluminum mirror. The detected time-domain signals, along with the spectra, prove the highly efficient and non-dispersive broad-band operation of the device in reflection. The high-frequency attenuation of the device spectrum which appears to build up starting close to 0.7 THz is consistent with the $TE_1$-mode transmission spectrum in FIG. 2.

Since this attenuation manifests for relatively low amplitude levels of the input spectrum (as evident by the reference), there is only minimal change in the reflected temporal signal.

Figure 4:
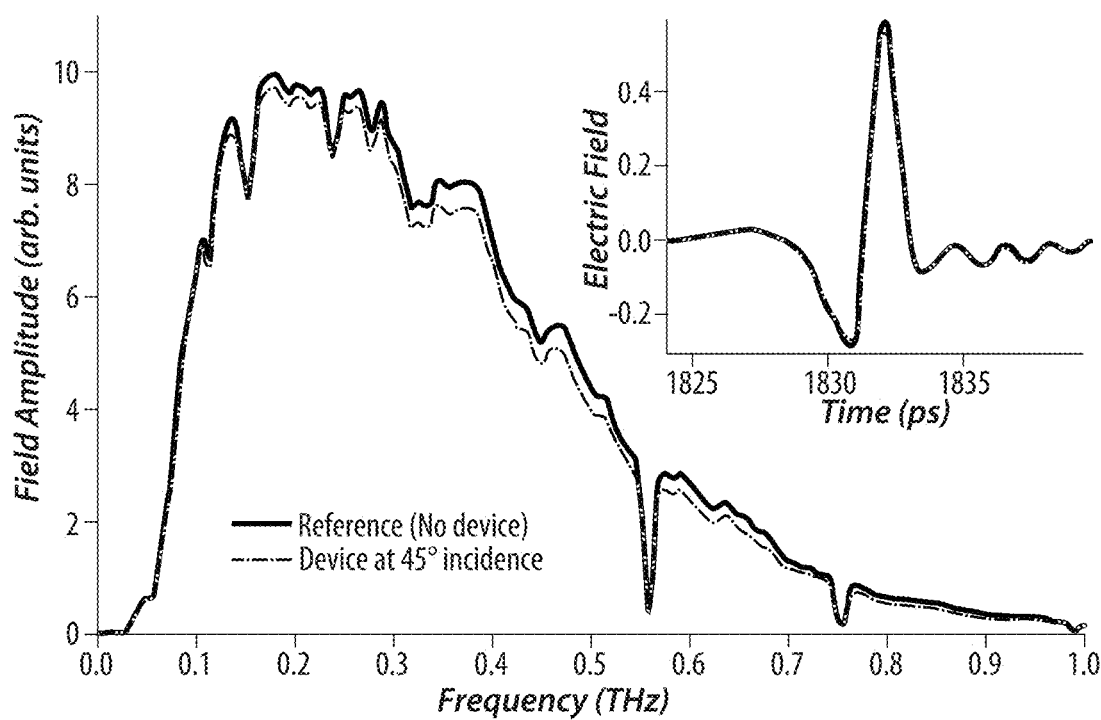
FIG. 4 show the transmission spectra in the TEM mode compared to free-space (i.e., no device), where the inset shows the corresponding time-domain signals.

To obtain the spectra in FIG. 4, the measurement configuration was changed back to transmission, and the polarization axes of the transmitter, receiver, and the polarizers, were rotated to be vertical, a configuration to investigate the purely TEM-mode behavior of the device. One curve corresponds to the reference signal when there is no device in the beam path. Another curve corresponds to the signal when the device is at 45° incidence to the input beam. Detected time-domain signals, along with the amplitude spectra, proved the highly efficient and non-dispersive broad-band operation of the device in transmission. This observation is not surprising since the TEM mode of the PPWG is a very low-loss and dispersion-less propagating mode. However, it should be noted that in order to obtain this efficient propagation it was important for the collimated beam axis to be aligned so as to be parallel to the plate surfaces with high accuracy, and also for the input polarization direction to be exceptionally well perpendicular to the plate surfaces. Deviations from these two conditions (by more than a few degrees) would result in additional losses, as the oblique incidence results in a longer interaction path-length, compared to that with normal incidence. It is not only the added ohmic loss that comes into play here, but also the relative parallelism of the stack of plates.

Figure 5:
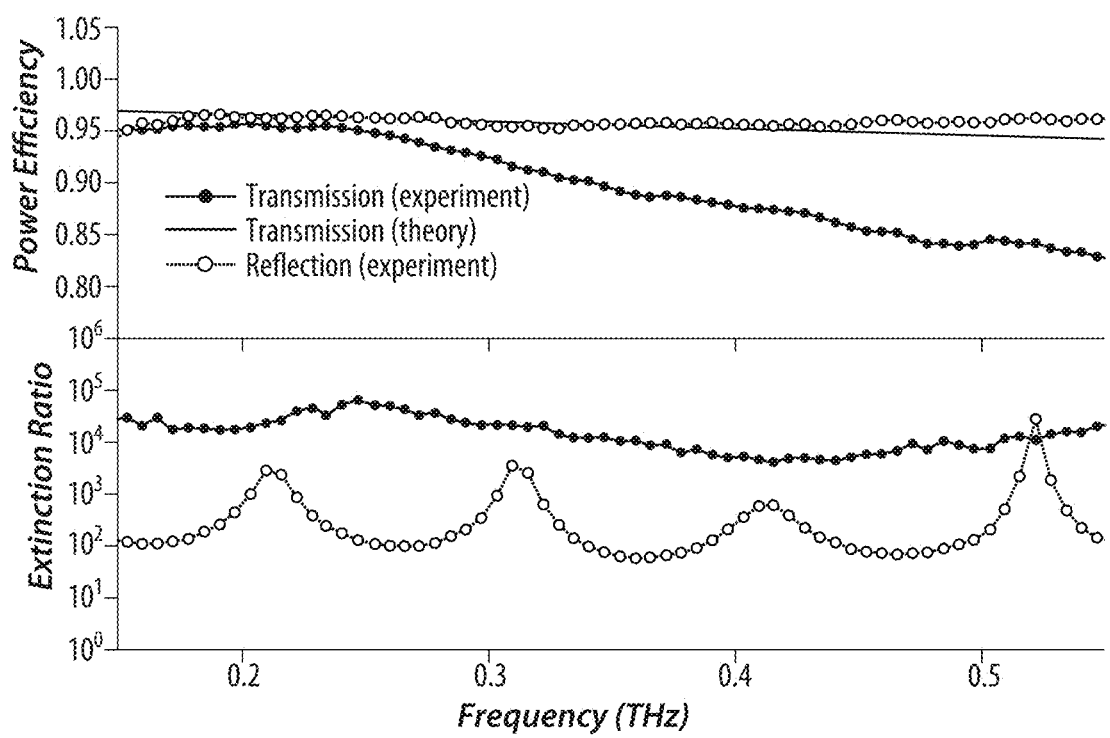
FIG. 5 upper graph shows the Power Efficiency for the transmission (TEM) (lower trace) and the reflection ($TE_1$) (upper trace) arms, while the lower graph illustrates Extinction ratio for the transmission and reflection arms, respectively, measured with the input polarization at 45° to the plates.

Using the above spectra, we can deduce the power efficiency of the device for the transmission and reflection arms. These efficiency curves are plotted in FIG. 5 for transmission and reflection, respectively, within the operational bandwidth of the PBS. For the reflection arm, the efficiency curve is relatively flat throughout the bandwidth, and indicates a power efficiency of 96% at both 0.2 THz and 0.5 THz, for example. This corresponds to an insertion loss of only 0.18 dB. For the transmission arm, the efficiency is 96% at 0.2 THz, and drops to 84% at 0.5 THz. This corresponds to an insertion loss of 0.76 dB. For comparison, also plotted is the theoretical transmission (blue solid curve) taking into account only the ohmic loss associated with TEM-mode propagation. The discrepancy with the experimental curve (especially as the frequency increases) implies that there are other sources of loss. Part of this extra loss is caused by the non-negligible impedance mismatch at the input and output surfaces of the device, even in the case of TEM-mode propagation. This gives rise to two small reflections from these virtual surfaces, which may also be affected by the finite thickness of the plates. In fact, these reflections played a role in the subsequent measurements that were carried out to estimate the cross-polarization extinction ratios of the PBS.

In another measurement to estimate the extinction ratios, the input polarization was oriented at 45° to the horizontal plate surfaces, and both the vertical and horizontal components of the output were measured, for both the transmission and reflection configurations separately. Therefore, for the transmission arm, in addition to the major component of the output that is polarized perpendicular to the plates, this also measures the minor component that is polarized parallel to the plates. This minor cross-polarization component is a result of energy leakage due to subtle device imperfections. The squared ratio of these two components gives the extinction ratio as plotted in FIG. 5(b), which indicates extinction ratios of 42 dB and 39 dB at 0.2 THz and 0.5 THz, respectively. Similarly, for the reflection arm, in addition to the major component polarized parallel to the plates, this measures the minor component polarized perpendicular to the plates. In this case, the cross-polarization component is due to the two TEM-mode reflections at the input and output surfaces, as discussed above. The estimated extinction ratio when plotted displayed some ripple is due to the associated Fabry-Perot effect, but showed extinction ratios of 28 dB and 22 dB at 0.2 THz and 0.5 THz, respectively. These values are not as impressive as for the transmission arm, but one way to improve this extinction would be to add a polarizer to the reflection arm.

Figure 6A:
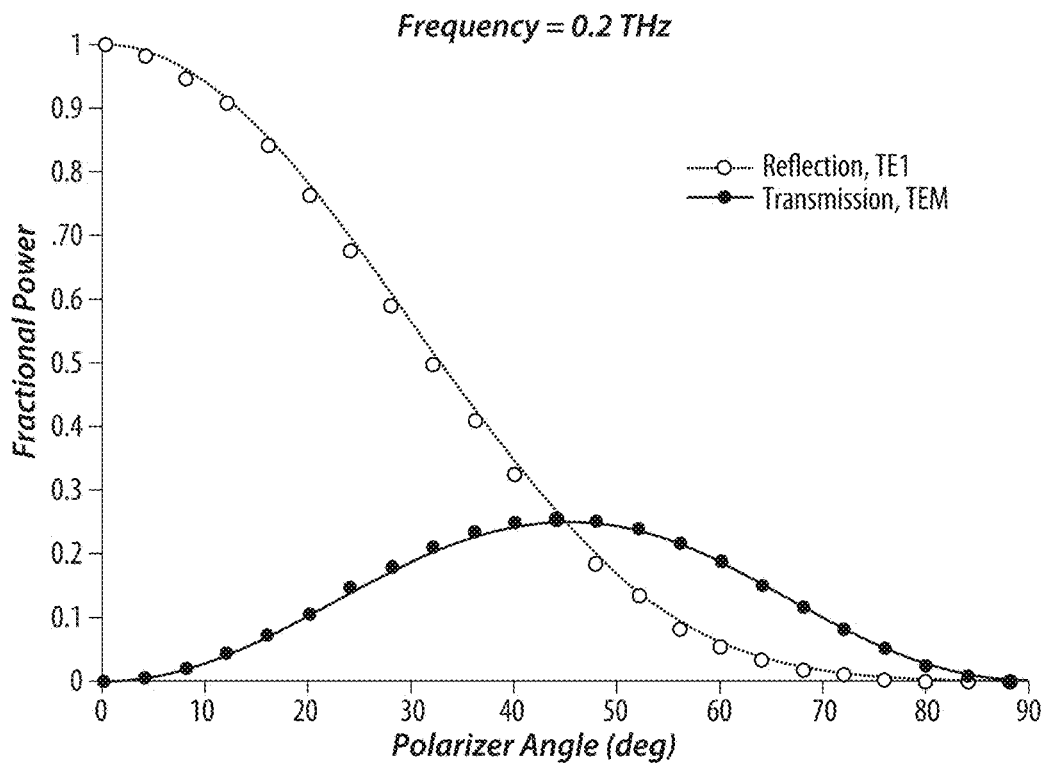
FIGS. 6A and 6B illustrate fractional power division into the transmission and reflection arms as a function of the input polarization angle.
Figure 6B:
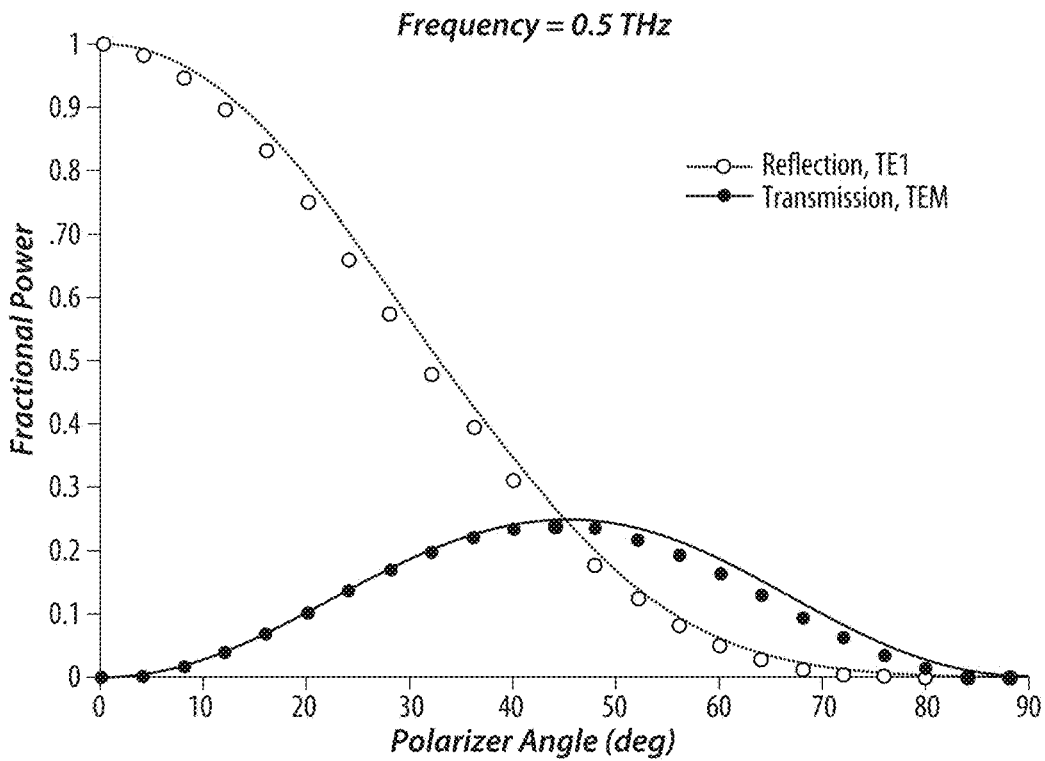

The final characterization step of the PBS was to measure the power division into the two output arms as a function of the input polarization angle. Here, the input polarization is initially set parallel to the plate surfaces by the transmitter, and is rotated by the input-side polarizer in steps of 4°. Then, in the reflection configuration, the output is detected with the output-side polarizer (and receiver) oriented parallel to the plates. Similarly, in the transmission configuration, the output is detected with the output-side polarizer (and receiver) oriented perpendicular to the plates. The experimental results for the frequencies of 0.2 THz and 0.5 THz, are plotted in FIGS. 6A and 6B, respectively, and agree very well with the theoretical power dependences of $\cos^4\theta$ and $\cos^2\theta \sin^2\theta$ given by the solid curves for the reflection and transmission arms, respectively. These results confirm that one can achieve a desired power division simply by rotating the input polarization axis, hence, a versatile PBS.

The foregoing description and report of the measurement results illustrates that the artificial dielectric polarizing beam splitter can be configured to operate with very high efficiency and high extinction ratios to separate polarization states of a terahertz beam, and that by initially rotating the input beam polarization one can achieve any desired power division, offering far better performance than other demonstrated methods. The conductive plate artificial dielectric construction is scalable to a range of terahertz frequencies.

These and other features of the invention will be understood from the description of exemplary embodiments above, and from the claims appended hereto.

What is claimed is:

1. A polarizing-beam-splitter comprising: thin electrically conductive metal sheets, each of the thin electrically conductive metal sheets having an edge and a thickness that is less than or equal to one-twentieth the wavelength $\Lambda$ of a terahertz signal, the thin electrically conductive metal sheets arranged in a stack to define wave propagation passages for energy of a terahertz input beam directed at an angle to a face formed by edges of the sheets, which constitutes an artificial dielectric that operates below a frequency cutoff to enable selective transmission through the wave propagation passages and reflection from the face, wherein the terahertz beam separates into a first polarization component selectively transmitted along a transmission path in the wave propagation passages between successive thin electrically conductive metal sheets and a second polarization component reflected from the face, thus separating polarization states of the input beam along different reflection and transmission paths, wherein a separation to the two polarization states is carried out with an extinction ratio better than 20 dB.

2. The polarizing-beam-splitter of claim 1 wherein the thin electrically conductive metal sheets are flat.

3. The polarizing-beam-splitter of claim 2 wherein the thin electrically conductive metal sheets are without micropatterned surface features.

4. The polarizing-beam-splitter of claim 2 wherein the thin electrically conductive metal sheets are without dielectric material dielectric material sandwiched between sheets.

5. The polarizing-beam-splitter of claim 2 wherein the thin electrically conductive metal sheets are without plastic material sandwiched between sheets.

6. The polarizing-beam-splitter of claim 2 wherein the thin electrically conductive metal sheets are without polymer material sandwiched between sheets.

7. The polarizing-beam-splitter of claim 2 wherein the thin electrically conductive metal sheets are without insulator material sandwiched between sheets.

8. The polarizing-beam-splitter of claim 1 wherein the splitting of the input energy into the transmitted and reflected beams is controlled by rotating the polarization axis of the input beam.

* * * * *